United States Patent
Ahn et al.

(10) Patent No.: US 11,776,456 B2
(45) Date of Patent: Oct. 3, 2023

(54) DISPLAY DEVICE

(71) Applicant: LG ELECTRONICS INC., Seoul (KR)

(72) Inventors: Sungdae Ahn, Seoul (KR); Donghun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/695,680

(22) Filed: Mar. 15, 2022

(65) Prior Publication Data

US 2022/0392392 A1 Dec. 8, 2022

(30) Foreign Application Priority Data

Jun. 8, 2021 (KR) .................. 10-2021-0074351

(51) Int. Cl.
*G09G 3/20* (2006.01)

(52) U.S. Cl.
CPC ....... *G09G 3/2092* (2013.01); *G09G 2320/02* (2013.01); *G09G 2370/04* (2013.01)

(58) Field of Classification Search
CPC .............. G09G 3/3406; G09G 3/3611; G09G 2320/062; G09G 2320/0626; G09G 2320/0653; G09G 2360/16
See application file for complete search history.

(56) References Cited

U.S. PATENT DOCUMENTS

| | | | | |
|---|---|---|---|---|
| 2002/0044691 A1* | 4/2002 | Matsugu | ................ | G06V 10/10 382/218 |
| 2006/0149401 A1* | 7/2006 | Chung | ................... | H04N 5/775 348/E5.002 |
| 2009/0268105 A1* | 10/2009 | Kohashikawa | ...... | G09G 3/3406 348/790 |
| 2011/0246891 A1* | 10/2011 | Schubert | ................ | G06F 9/452 715/740 |
| 2015/0279321 A1* | 10/2015 | Falconer | ................. | G09G 5/10 345/589 |
| 2016/0361641 A1* | 12/2016 | Koizumi | ................ | G08C 19/00 |
| 2017/0142589 A1* | 5/2017 | Park | .................... | H04L 63/0861 |

* cited by examiner

*Primary Examiner* — Shaheda A Abdin
(74) *Attorney, Agent, or Firm* — LEE, HONG, DEGERMAN, KANG & WAIMEY PC

(57) ABSTRACT

Disclosed is a display device including an external device interface configured to receive image data of an external device, a display configured to output the image data, and a controller configured to recognize a type of the external device using reference information of the external device, to correct image quality of the image data using distance information corresponding to the type of the external device, and to output the corrected image data.

10 Claims, 10 Drawing Sheets

(a)

(b)

(a)

(b)

< CSF (Contrast Sensitivity Function) Function >

(a)

(b)

(a)

(b)

(a)

(b)

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2021-0074351, filed on Jun. 8, 2021, the contents of which are hereby incorporated by reference herein in its entirety.

FIELD

The present disclosure relates to a display device for providing various output contents.

BACKGROUND

A display device has a function for receiving, processing, and displaying an image to be viewed by a user. The display device receives, for example, a broadcast signal selected by a user among broadcast signals transmitted from a broadcast station, separates an image signal from the received signal, and displays the separated image signal on the display again.

Recently, due to the development of broadcasting technology and network technology, the functions of the display device have been diversified considerably, and the performance of the device has also been improved accordingly. That is, display devices have been developed to provide not only broadcast contents but also various other content to users. For example, the display device may provide game play, music listening, Internet shopping, and customized information using various applications as well as programs received from a broadcast station. In order to perform the extended functions, the display device is basically connected to other devices or a network using various communication protocols and may provide ubiquitous computing to users. That is, display devices have evolved into smart devices that enable network connectivity and ubiquitous computing.

As compatibility with other electronic devices increases, the display device may provide image content executed by a smartphone, a tablet, a PC, various console game devices, and a set-top box to a user by wire or wirelessly using technologies such as miracast, smart view, and mirroring.

Through the above method, the user may view content, which was previously provided on a small screen, on a large screen using a display device.

In contrast, the user has a different viewing distance depending on the type of an electronic device connected to the display device and the type and purpose of output content, and in this case, the display device provides consistent image quality irrespective of the type of the connected electronic device, and thus there is a problem in that a resolution optimized for a user viewing distance and environment is not provided.

SUMMARY

An object of the present disclosure is to appropriately correct image data according to the type of an external device connected to a display device for outputting the image data of the external device.

An object of the present disclosure is to adjust sharpness of an output image depending on a viewing distance of image data of an external device.

According to an embodiment of the present disclosure, a display device includes an external device interface configured to receive image data of an external device, a display configured to output the image data, and a controller configured to recognize a type of the external device using reference information of the external device, to correct image quality of the image data using distance information corresponding to the type of the external device, and to output the corrected image data.

The type of the external device may include at least one of a console device, a tablet, or a PC.

The distance information may be a distance at which a user views the external device, and first distance information corresponding to the PC may have a smaller value than second distance information corresponding to the console device.

When the external device is a PC, the controller may generate PC image data formed by applying a weight to a high frequency component of the image data to correct image quality of the image data and may output the PC image data through the display.

The PC image data formed by correcting the image quality of the image data may be generated using a PC lookup table having a gain that is increased as a frequency is increased, and the PC image data may be image data formed by increasing sharpness of a detail component of the image data.

When the external device is a console device, the controller may generate console image data formed by applying a weight to an intermediate frequency component of the image data to correct image quality of the image data and may output the console image data through the display.

The console image data formed by correcting the image quality of the image data may be generated using a console lookup table having a gain that is reduced as a frequency is increased, and the console image data may be image data formed by increasing sharpness of an edge component of the image data.

When a zone plate pattern indicated by overlapping a plurality of concentric circles is evaluated, in a case of the PC image data, aliasing in a high frequency region that is an outline portion of the pattern may more occur than aliasing in an intermediate frequency region that is a central portion of the pattern.

When a zone plate pattern indicated by overlapping a plurality of concentric circles is evaluated, in a case of the console image data, aliasing in a high frequency region that is an outline portion of the pattern may less occur than aliasing in an intermediate frequency region that is a central portion of the pattern.

According to an embodiment of the present disclosure, an operating method of a display device includes recognizing a type of an external device using reference information of the external device, correcting image quality of image data received from the external device using distance information corresponding to the type of the external device, and outputting the corrected image data.

The correcting the image quality of the received image data may include, when the external device is a PC, generating PC image data by applying a weight to a high frequency component of the image data.

The generating the PC image data may include generating the PC image data formed by correcting the image quality of the image data using a PC lookup table having a gain that is increased as a frequency is increased.

The PC image data may be image data formed by increasing sharpness of a detail component of the image data.

The correcting the image quality of the received image data may include, when the external device is a console device, generating console image data by applying a weight to an intermediate frequency component of the image data.

The generating the console image data may include generating the console image data formed by correcting the image quality of the image data using a console lookup table having a gain that is reduced as a frequency is increased.

The console image data may be image data formed by increasing sharpness of an edge component of the image data.

DETAILED DESCRIPTION

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
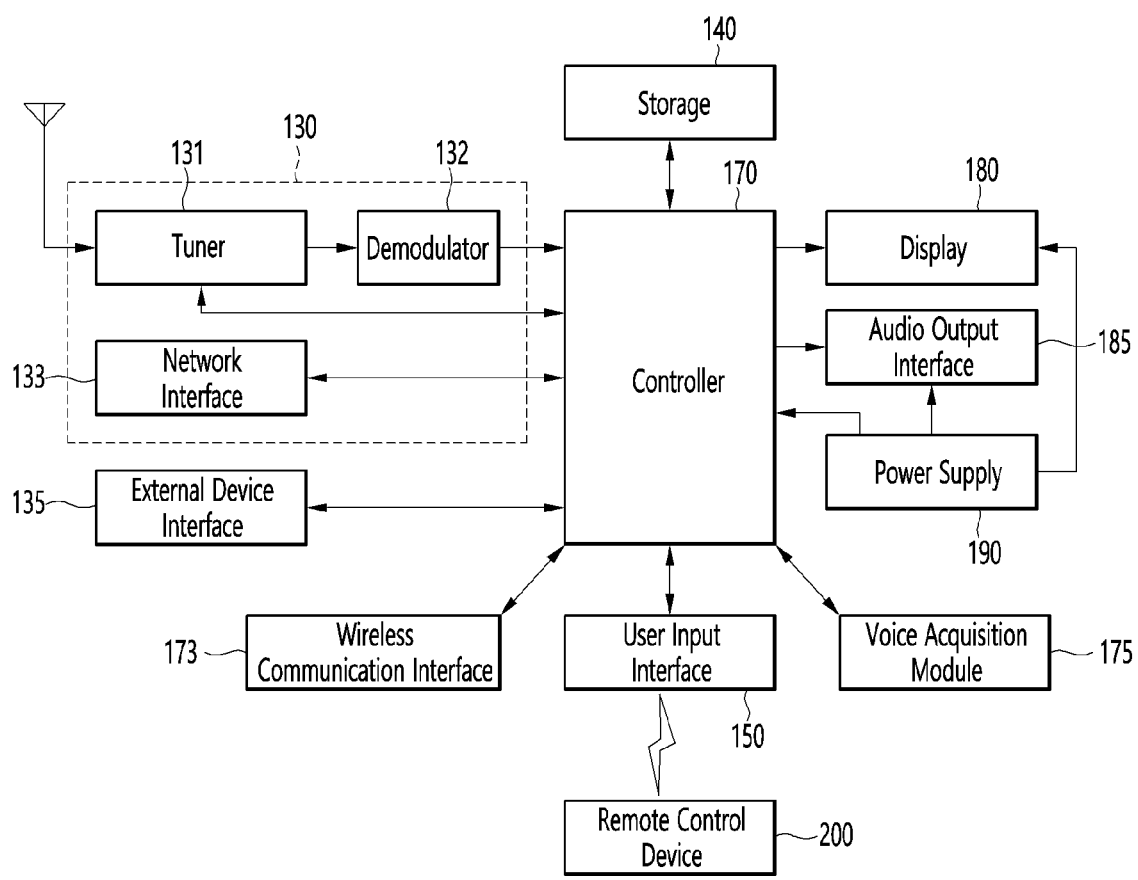
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into image signals, audio signals, and broadcast program related data signals and restore the divided image signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
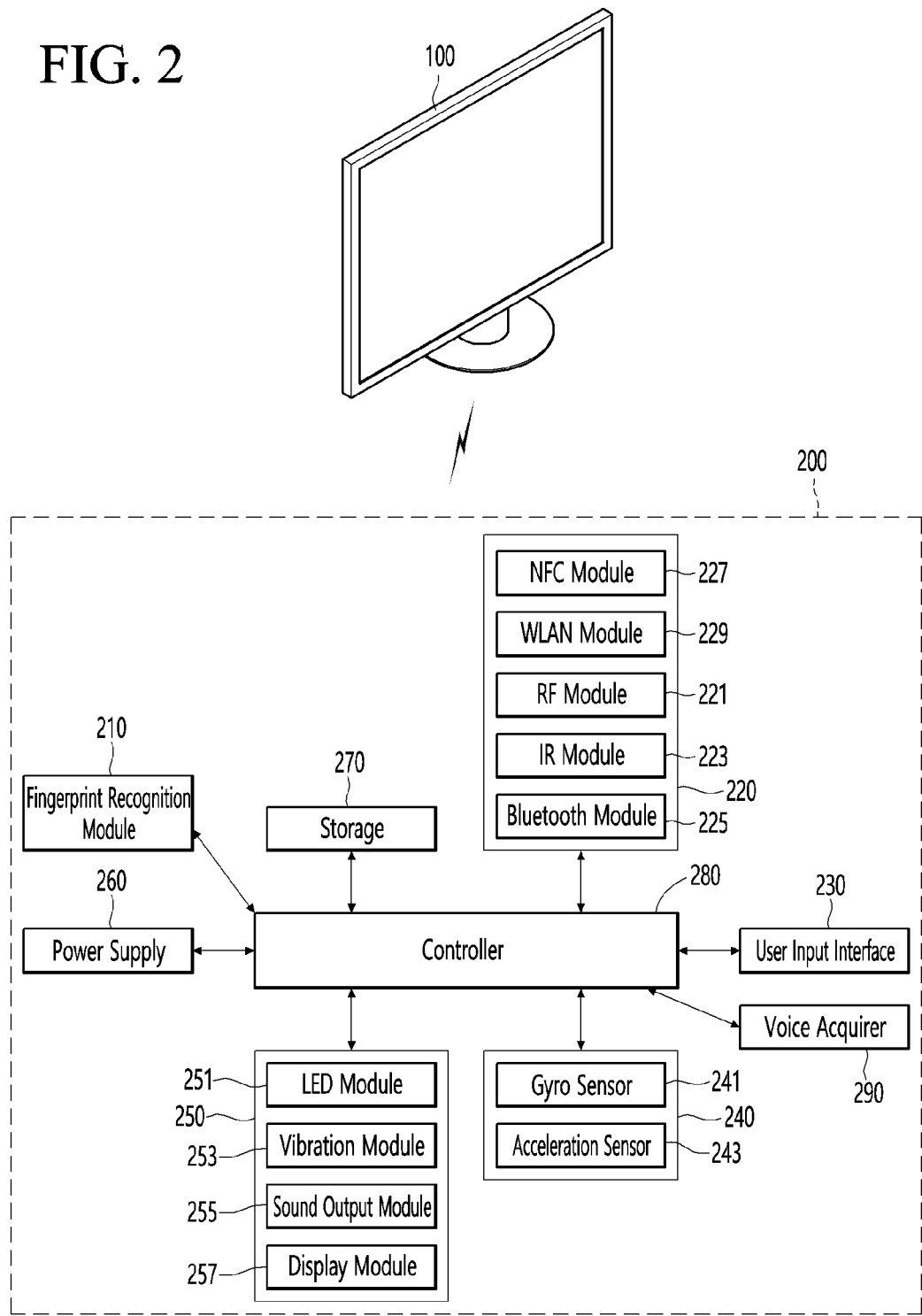
FIG. 2 is a block diagram illustrating a remote control device according to an embodiment of the present disclosure.
Figure 3:
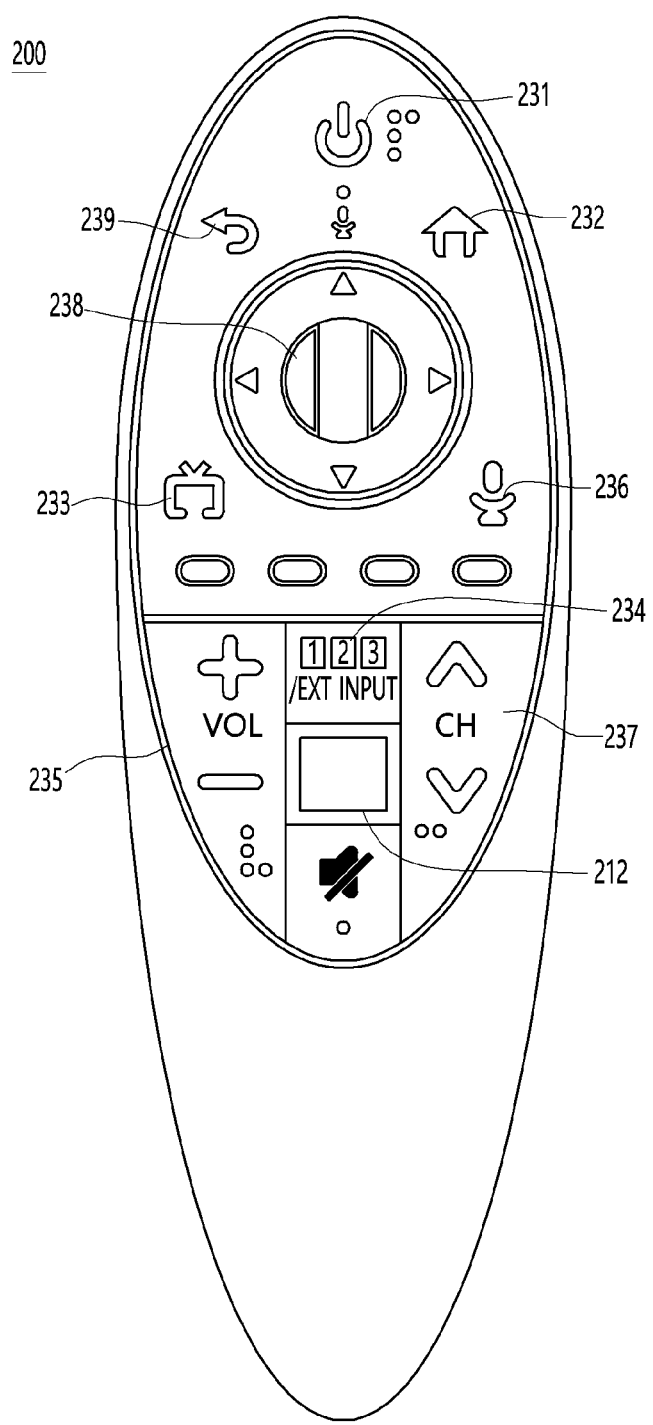
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
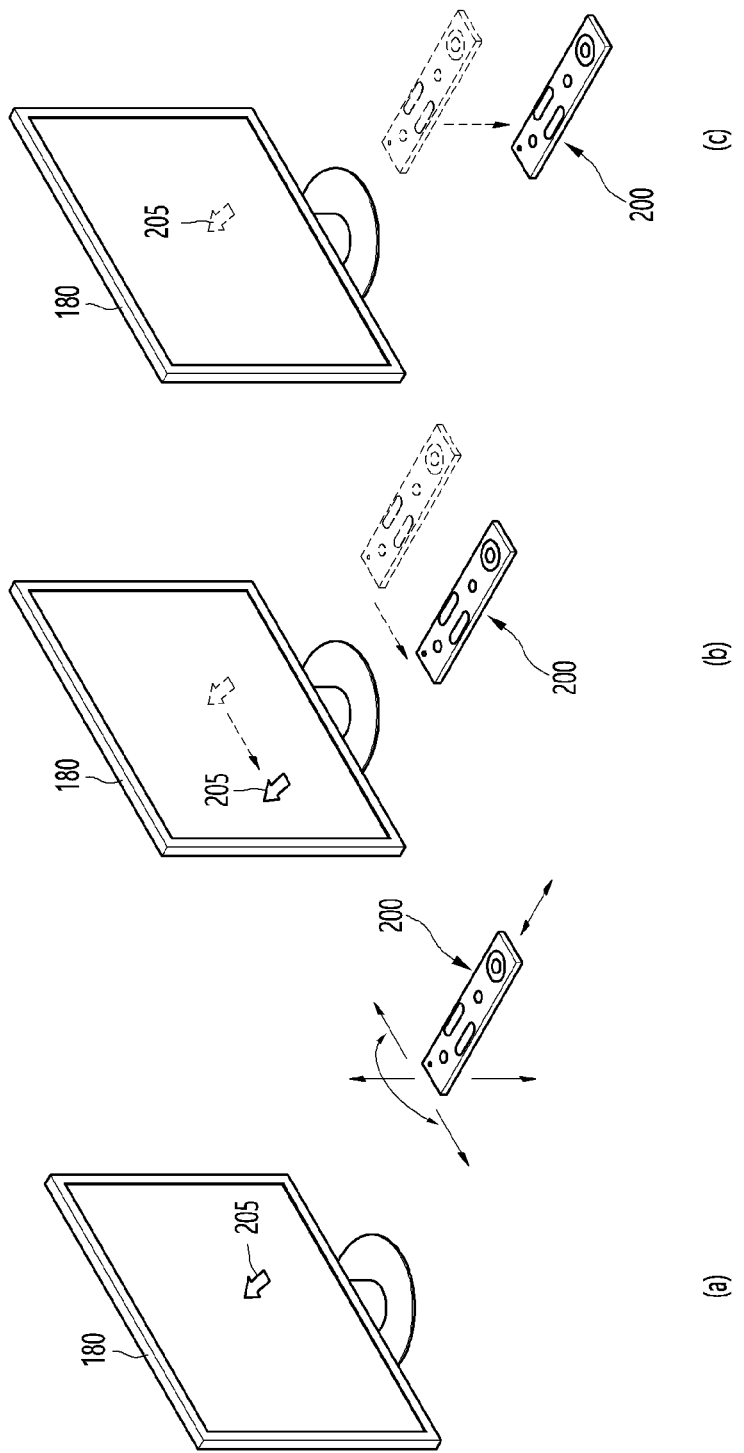
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
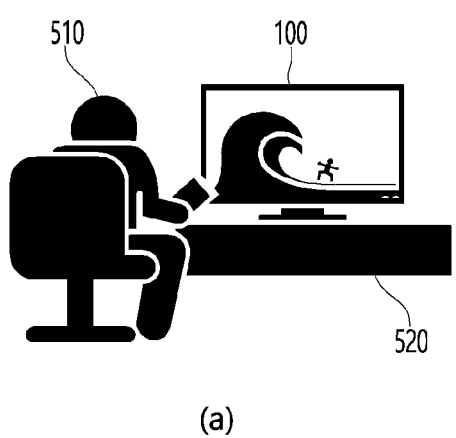
FIG. 5 is a diagram showing a scene for explaining a viewing distance of a console device and a desktop PC according to an embodiment of the present disclosure.
Figure 5:

FIG. 5 is a diagram showing a scene for explaining a viewing distance of a console device and a desktop PC according to an embodiment of the present disclosure.

Referring to FIGS. 5A and 5B, a user may connect the display device 100 to an external device 520 and may use the connected devices.

In detail, according to an embodiment of the present disclosure, the display device 100 may be connected to the external device by wire or wirelessly. In this case, a distance between a user and the display device may vary depending on the type of the external device.

For example, referring to FIG. 5A, when the external device connected to the display device 100 is a console device 520, a user 510 may view the display device connected to the external device using the remote control device 200, a joystick, or the like while sitting on a sofa or at a distance from the display device.

In more detail, when the console device 520 provides a game, the user may control the external device and the display device using the joystick while being separated from the display device by a first distance (e.g., 2 to 3 meters).

According to another embodiment of the present disclosure, referring to FIG. 5B, when the external device connected to the display device 100 is a desktop PC, the user may manipulate a keyboard and a mouse from a distance right in front of the desktop. For example, a distance between the desktop PC and the display device and the user may be a second distance (e.g., within 1 meter).

That is, as described above, the user viewing distance may vary depending on the type of the external device in a usage scenario of the display device connected to the external device, and thus an optimal method for improving image quality will be described below.

Figure 6:
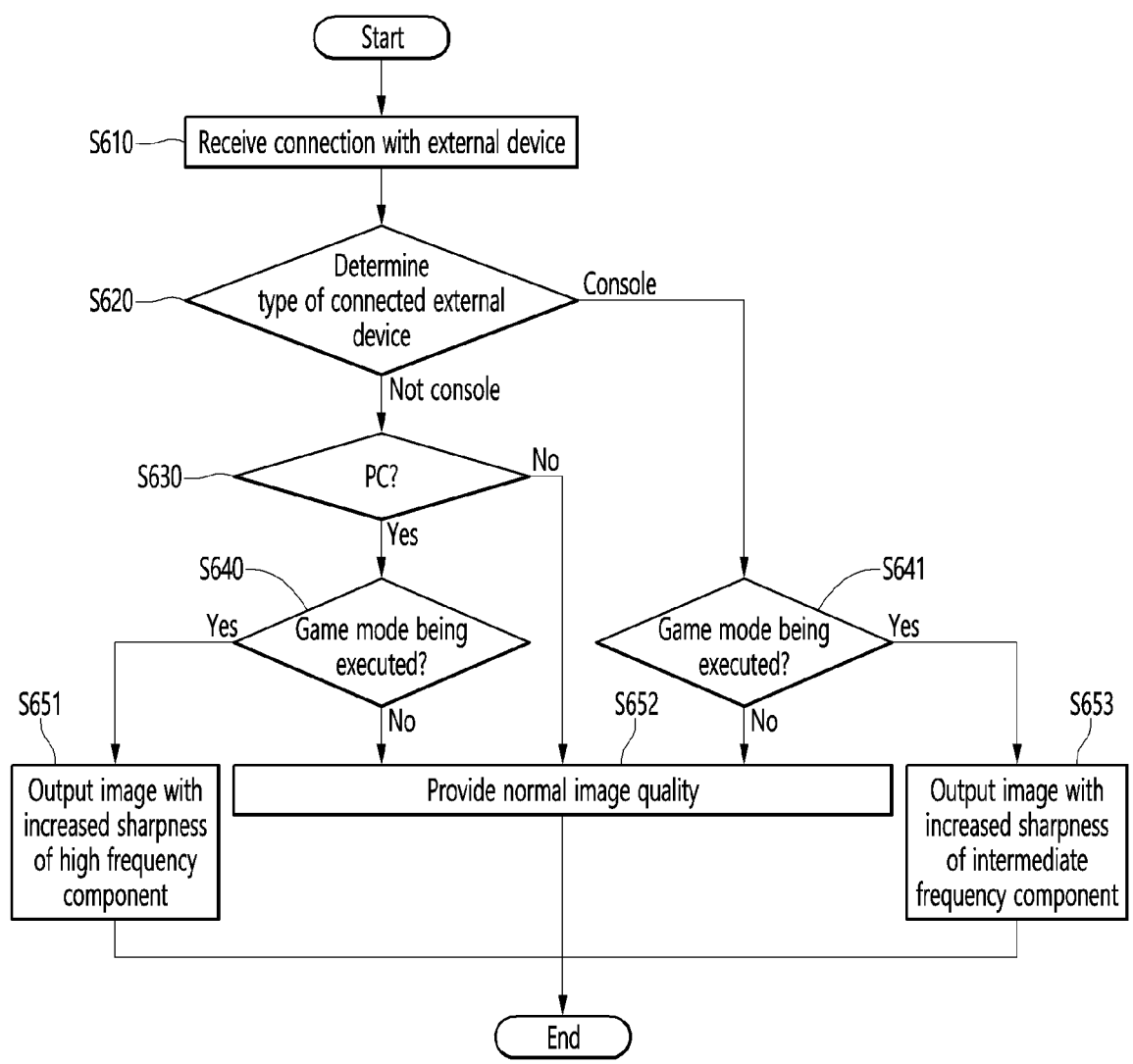
FIG. 6 is a flowchart showing an operation of a display device according to an embodiment of the present disclosure.

FIG. 6 is a flowchart showing an operation of a display device according to an embodiment of the present disclosure.

Referring to FIG. 6, the external device interface 135 of the display device 100 may be connected to the external device and may receive image data of the external device (S610).

In this case, the type of the external device may include various electronic devices such as a desktop PC, a console device, a DVD player, a set-top box, a mobile device, a notebook PC, or an Ultrabook.

In detail, the display device 100 and the external device may be connected to each other by wire or wirelessly.

As described above, the wired connection may be achieved through various cables such as HDMI or DVI, the wireless connection may be achieved using method used in WiFi, Bluetooth, and other network communication.

A controller of the display device according to an embodiment of the present disclosure may determine the type of the connected external device (S620).

After determining the type of the external device, the controller 170 may correct image quality of the image data using distance information corresponding to the type of the external device and may output the corrected image data.

Hereinafter, this will be described in detail.

First, the controller 170 of the display device according to an embodiment of the present disclosure may determine the type of the connected external device (S620).

In detail, the controller 170 according to an embodiment of the present disclosure may determine whether the type of the connected external device is a console device.

In more detail, upon receiving connection with the external device, the controller 170 of the display device may receive unique reference information of the external device and may recognize the type of the external device according to reference information of the external device.

For example, when the external device is a console device such as a Play Station, Xbox, or Nintendo Switch, if any one of external electronic devices is connected to the display device, the controller 170 may receive the unique reference information of the external electronic device and may determine the type of the connected external electronic device.

That is, the controller 170 may recognize an input label of external input provided from the display device as a console game device.

In another example, when connected to a PC, the controller 170 may receive reference information corresponding to the PC and may recognize an input label provided from the display device as a PC.

In this case, the reference information corresponding to the PC may be resolution information used in the PC.

The controller 170 according to an embodiment of the present disclosure may pre-store resolution information used in the PC in a memory, and upon receiving reference information matched with the pre-stored information, the controller 170 may recognize PC connection.

In addition, the display device may also change external input such as a HDMI to PC connection through a display.

After determining the type of the connected external device, the controller 170 according to an embodiment of the present disclosure may correct image quality of the image data using distance information corresponding to the type of the external device.

Hereinafter, the above procedure in operations S630 to S650 will be described.

In this case, the distance information may refer to a distance at which a user normally watches the display device connected to the external as described above with reference to FIG. 5.

For example, when the external device is a console device, first distance information corresponding to the console device may be 2 to 3 meters. When the external device is a PC, second distance information corresponding to the PC may be within 1 meter.

That is, the first distance information corresponding to the PC may have a smaller value than the second distance information corresponding to the console device.

The first distance information may be distance information derived from the fact that a distance at which the PC is used is generally smaller than a distance at which the console device is used.

Specific meter information corresponding to the external device is only an example, and is not limited to the above description.

When determining that the type of the connected external device is a console device in operation S620, the controller according to an embodiment of the present disclosure may determine whether a game mode is being executed in the console device (S641).

In this case, the game mode may refer to a mode in which a game provided by the console device is executed.

When determining that the type of the connected external device is not a console device in operation S620, the controller according to an embodiment of the present disclosure may determine whether the connected external device is a PC (S630). In this case, when the controller determine that the type of the connected external device is not a PC (S630-NO), the display device may provide image data provided by the external device with general resolution that is not corrected (S652).

When determining that the type of the connected external device is a PC (S630—YES), the controller according to an embodiment of the present disclosure may determine whether the game mode is being executed in the PC (S640).

When determining that the game mode is not being executed in the external device (S640—NO), the controller according to an embodiment of the present disclosure may output image data received from the external device with normal image quality without correction through a display (S652).

Hereinafter, prior to a description of the case in which a game mode is executed by a console device, the terms used in the specification of the present disclosure will be defined below.

The frequency used in the present disclosure may be classified into a low frequency component, an intermediate frequency component, and a high frequency component.

In a space region of image data, the 'low frequency' component refers to a part with a small difference in color or brightness from a surrounding region, and the 'high frequency' component refers to a part with a large difference in color or brightness from a surrounding region.

The 'intermediate frequency' component refers to a part in which the difference in color or brightness from the surrounding area is larger than the 'low frequency' component and smaller than the 'high frequency' component.

In more detail, the 'low frequency' component in an image refers to a part (e.g., a background part) in which edge and detail components are insignificant.

The 'intermediate frequency' component refers to an outline or an edge of an object.

The 'high frequency' component refers to a detail part, such as texture sensation, texture, etc. of an object.

The high frequency, the intermediate frequency, and the low frequency are not limited to a specific range, the high frequency may be interpreted as a frequency (i.e., a difference in color or brightness from a surrounding region) that is higher than the intermediate frequency and the low frequency and the intermediate frequency may be interpreted as a frequency that is higher than the low frequency.

When determining that the gate mode is being executed in the external device (S640—YES), the controller according to an embodiment of the present disclosure may generate image data received from the external device as PC image data with increased sharpness of a high frequency component through the display and may output the generated PC image data (S651).

In this case, the PC image data may be an image formed by increasing the sharpness of the high frequency component in image data provided by the external device to increase the sharpness of detail and texture components included in the image data.

A correction procedure of S651 will be described in detail with reference to FIGS. 7 and 8.

When a game mode is not executed in the console device (S641-NO), the controller according to an embodiment of the present disclosure may output the image data received from the external device with normal image quality without correction through a display (S652).

According to the present disclosure, the normal image quality may refer to image data with basically provided image quality when the external device and the display device are connected to each other.

When the game mode is executed in the console device (S641—YES), the controller according to an embodiment of the present disclosure may apply a weight to the intermediate frequency component of the image data to generate console image data formed by correcting image quality of the image data and may output the console image data through the display (S653).

In this case, the console image data may be an image formed by increasing the sharpness of the intermediate frequency component in image data provided by the external device to increase the sharpness of an edge component such as an outline of an object.

A correction procedure of S653 will be described in detail with reference to FIGS. 7 to 8.

Figure 7:
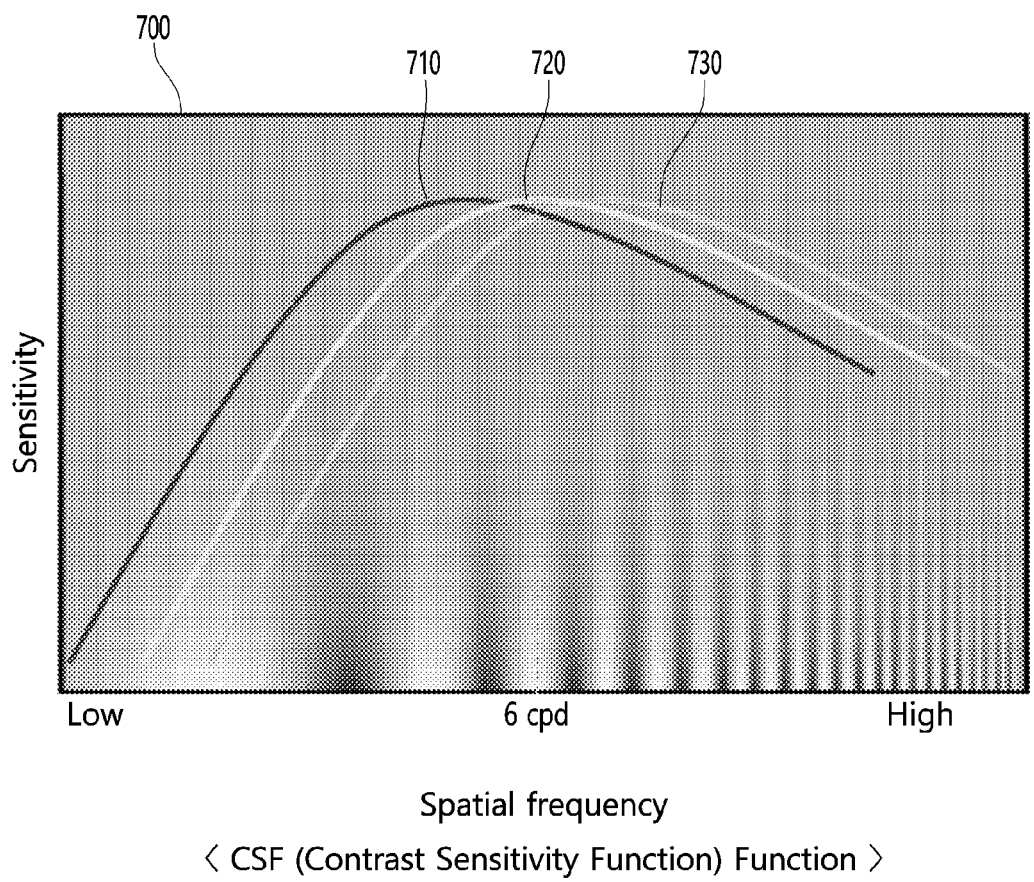
FIG. 7 is a diagram for explaining a technical background of correction of image data corresponding to distance information according to an embodiment of the present disclosure.

FIG. 7 is a diagram for explaining a technical background of correction of image data corresponding to distance information according to an embodiment of the present disclosure.

A console game is often used at a distance of 2 to 3 meters from a display device, and a PC game is often used within 1 meter because a keyboard and a mouse need to be used directly.

That is, a viewing distance environment may vary.

The controller 170 according to an embodiment of the present disclosure may set image quality information to be provided to a user to be different depending on the viewing distance.

Referring to FIG. 7, a contrast sensitivity function (CSF) 700 may be a graph showing the sensitivity of the eye with respect to a spatial frequency.

Assuming that a user views a specific display device, as seen from FIG. 7, sensitivity may be relatively uniform with respect to a frequency in a normal viewing distance 720. For example, the normal viewing distance 720 may be 1.5 meters.

Assuming that the user views a specific display device, as seen from FIG. 7, sensitivity for the low frequency component and the intermediate frequency component may be relatively high compared with the normal viewing distance 720 at a long distance 710.

That is, in a viewing environment at the long distance 710, sensitivity for the high frequency component may be reduced compared with the normal viewing distance 720, and thus sensitivity for the intermediate frequency component of an outline (edge) of an object may be increased.

Assuming that the user views a specific display device, sensitivity for the high frequency component at a short distance 730 may be relatively high compared with the normal viewing distance 720.

That is, in a viewing environment at the short distance 730, the sensitivity for the high frequency component may be increased compared with the normal viewing distance 720, and thus the sensitivity for the high frequency component, such as detail and texture of image data, may be increased.

For example, in the case of a long distance, sensitivity for an outline of an object, an outline of a face, and a jaw line component may be increased.

In the case of a short distance, sensitivity to texture sensation, a texture component, a skin pore, an eyebrow, and hair may be increased.

Figure 8:
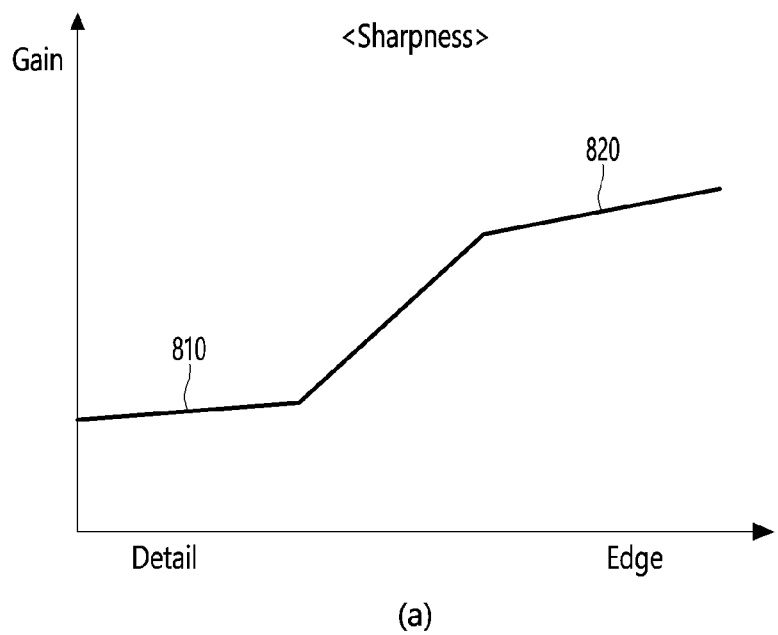
FIG. 8 is a diagram showing a lookup table according to an embodiment of the present disclosure.
Figure 8:
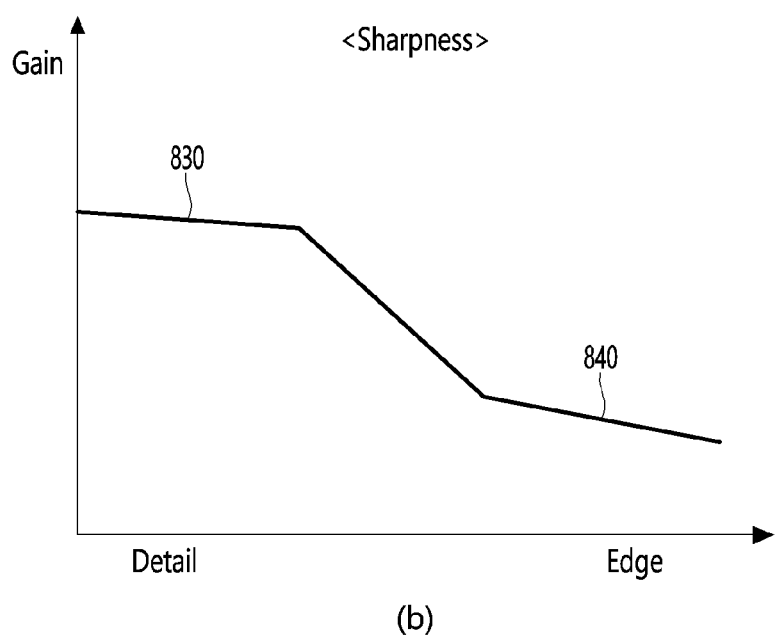

A lookup table of FIG. 8 may be generated based on the aforementioned characteristics of the human eye.

FIG. 8 is a diagram showing a lookup table according to an embodiment of the present disclosure.

Referring to FIG. 8A, when an external device connected to the display device 100 is a console device, first distance information corresponding to the console device is a relatively long distance, and thus the eye of the user may have reduced sensitivity for the high frequency component based on an appropriate distance, and the sensitivity for the intermediate frequency component such as an edge of an object may be increased.

The controller 170 according to an embodiment of the present disclosure may generate the console image data formed by correcting image quality of the image data using a console lookup table having a gain that is reduced as a frequency is increased.

The controller 170 may output the console image data through the display 180.

In detail, the console lookup table shown in FIG. 8A may be a lookup table that is set to apply a lower weight for a detail component 810 as the high frequency component than a weight for an edge component 820.

Accordingly, console image data corrected according to the console lookup table may be image data formed by increasing the sharpness of an edge component of the image data.

The corrected console image data may be image data formed by reducing the sharpness of a detail component of the image data.

Accordingly, a user may view an image with a further increased sharpness for the intermediate frequency component such as an edge of an object at the position of the first distance information corresponding to a console device.

Referring to FIG. 8B, when the external device connected to the display device is a PC, the second distance information corresponding to the PC may be a relatively short distance. Thus, the eye of the user may have increased sensitivity for the high frequency component based on an appropriate distance, and the sensitivity for the high frequency component such as a detail and texture included in an output image may be increased.

The controller 170 according to an embodiment of the present disclosure may generate the PC image data formed by correcting image quality of the image data using a PC lookup table having a gain that is increased as a frequency is increased.

The controller 170 may output the PC image data through the display 180.

In detail, the PC lookup table shown in FIG. 8B may be a lookup table that is set to apply a lower weight for a detail component 830 as the high frequency component than a weight for an edge component 840.

Accordingly, PC image data corrected according to the PC lookup table may be image data formed by increasing the sharpness of a detail component of the image data.

The corrected console image data may be image data formed by reducing the sharpness of an edge component of the image data.

Accordingly, a user may view an image with a further increased sharpness for the high frequency component such as a detail and a texture of an image at the position of the second distance information when using a PC.

Figure 9:
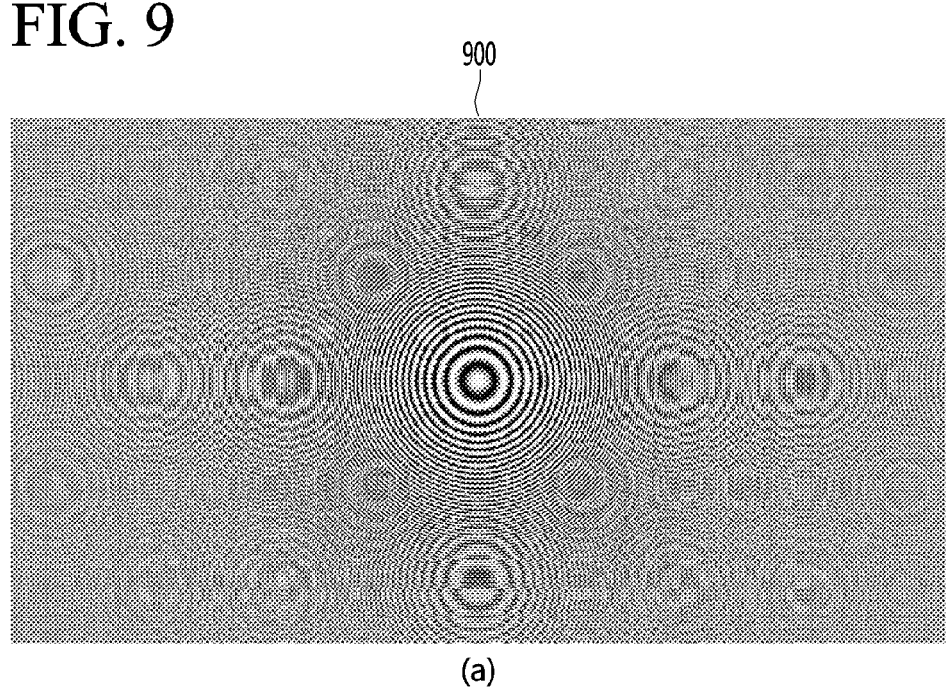
FIGS. 9 and 10 are diagrams for explaining a result of applying a frequency weight using a zone plate pattern according to an embodiment of the present disclosure.
Figure 9:
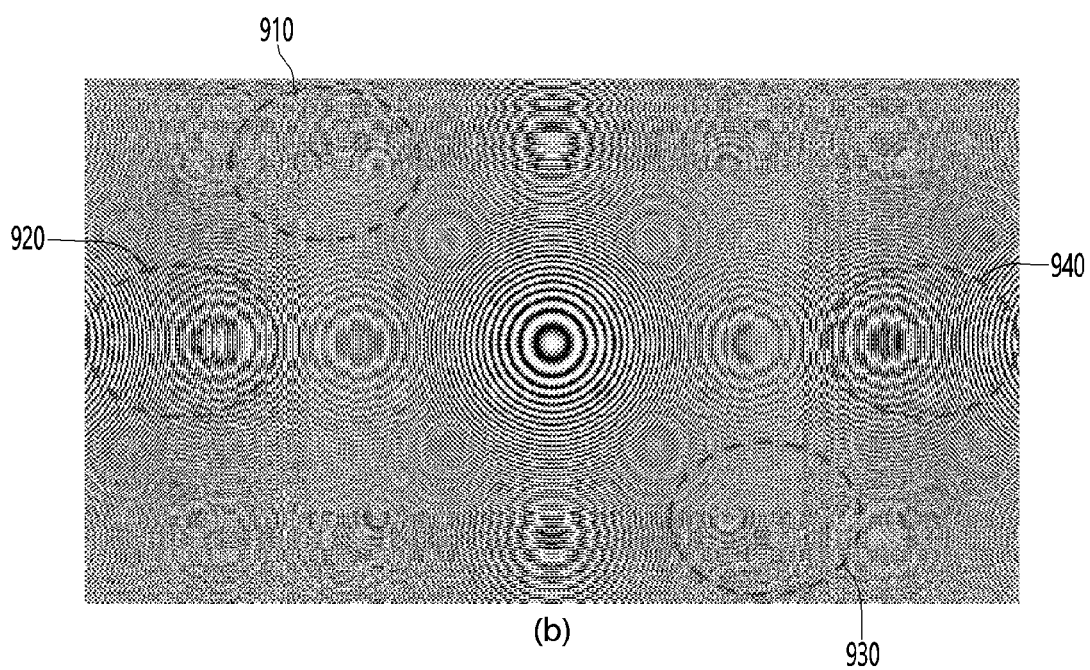
Figure 10:
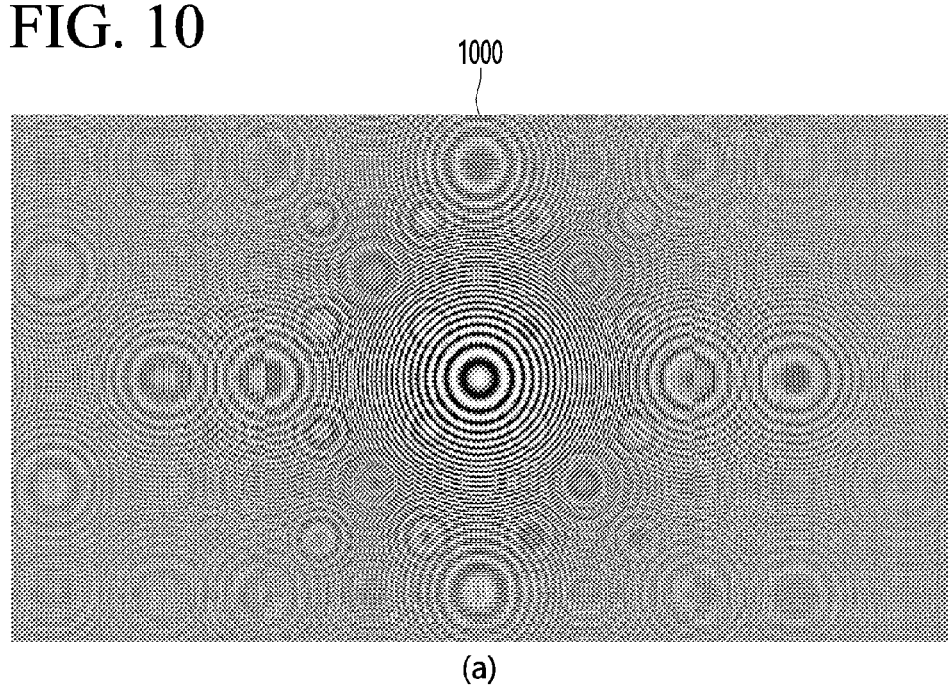
Figure 10:
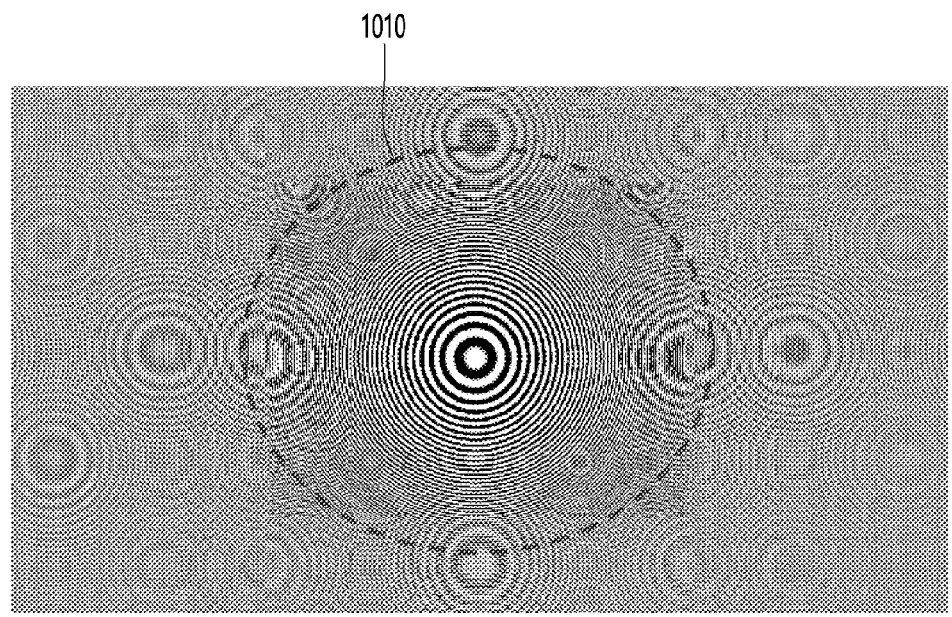

FIGS. 9 and 10 are diagrams for explaining a result of applying a frequency weight using a zone plate pattern according to an embodiment of the present disclosure.

First, FIG. 9 is a diagram for explaining image data corrected according to a PC lookup table when an external device is a PC according to an embodiment of the present disclosure.

Referring to FIGS. 9A and 10A, normal-quality image data 900 that is provided to a display device by a PC may indicate a zone plate pattern formed by overlapping several concentric circles.

At a central portion of the zone plate pattern 900, several concentric circles are configured to overlap each other and many outline (edge) characteristics corresponding to the intermediate frequency component are distributed, and at an outline portion of the zone plate pattern 900, texture and texture sensation data corresponding to the high frequency component may be expressed as a plurality of concentric circles.

The controller according to an embodiment of the present disclosure may apply a PC lookup table to the zone plate pattern 900 to generate image data corrected by applying a weight for the high frequency component and applying a relatively low weight for the intermediate frequency component.

FIG. 9B shows a zone plate pattern corrected according to a PC lookup table. It may be seen that texture and texture sensation aliasing 910, 920, 930, and 940 clearly appear due to a weight of a high frequency region of an outline of a pattern in the zone plate pattern corrected according to the PC lookup table.

Similarly, in the case of FIG. 10, the controller according to an embodiment of the present disclosure may apply the console lookup table to a zone plate pattern 1000 to generate image data corrected by applying a weight for the low frequency and intermediate frequency components and applying a relatively low weight for the high frequency component.

FIG. 10B shows a zone plate pattern corrected according to a console lookup table. It may be seen that outline and edge components 1010 clearly appear due to a weight of an intermediate frequency region of a central portion of a pattern in the zone plate pattern corrected according to the console lookup table.

In other words, when a zone plate pattern indicated by overlapping a plurality of concentric circles is evaluated, in the case of the PC image data, aliasing in a high frequency region that is an outline portion of the pattern more occurs than aliasing in an intermediate frequency region that is a central portion of the pattern, and when a zone plate pattern indicated by overlapping a plurality of concentric circles is evaluated, in the case of the console image data, aliasing in a high frequency region that is an outline portion of the pattern less occurs than aliasing in an intermediate frequency region that is a central portion of the pattern.

According to the present disclosure, resolution appropriate for an external device may be provided to a user by outputting image data corrected according to the type of the external device.

According to the present disclosure, image data optimized for a user viewing distance may be provided by adjusting the sharpness of an image depending on a viewing distance of a user who uses an external device.

The present disclosure may be embodied as computer-readable codes on a program recording medium. The computer-readable recording medium may be any recording medium that stores computer-readable data. Examples of computer readable media include hard disk drives (HDDs), solid state disks (SSDs), silicon disk drives (SDDs), read-only memory (ROM), random access memory (RAM), CD-ROMs, magnetic tapes, floppy Disc and optical data storage devices. Also, the computer may include the control unit 170 of the display apparatus 100.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device comprising:
an external device interface configured to receive image data from an external device;
a display configured to display the image data; and
a controller configured to:
recognize a type of the external device based on reference information received from the external device;
correct image quality of the displayed image data based on the type of the external device; and
cause the display to display the corrected image data,
wherein based on the external device being a PC, the image quality of the displayed image data is corrected to generate PC image data by applying a weight to a high frequency component of the displayed image data,
wherein the PC image data is generated using a PC lookup table having a gain that is increased as a frequency of the displayed image data is increased,
wherein the PC image data includes an increased sharpness of a detail component of the displayed image data, and
wherein the controller generates the PC image data by correcting a zone plate pattern composed of circles corresponding to intermediate frequency component and circles corresponding to high frequency component, according to the PC lookup table, and aliasing in a high frequency region that is an outline portion of the pattern occurs more than aliasing in an intermediate frequency region that is a central portion of the pattern in the zone plate pattern according to the generated PC image data.

2. The display device of claim 1, wherein the controller acquires viewing distance information based on the type of the external device and corrects the image quality of the displayed image data according to the viewing distance information.

3. The display device of claim 2, wherein the type of the external device is at least one of a console device, a tablet, or a PC.

4. The display device of claim 3, wherein the viewing distance information is a distance at which a user views the display device, and
wherein a first distance information corresponding to the PC is less than a second distance information corresponding to the console device.

5. The display device of claim 1, wherein based on the external device being a console device, the image quality of the displayed image data is corrected to generate console image data by applying a weight to an intermediate frequency component of the displayed image data.

6. The display device of claim 5, wherein the console image data is generated using a console lookup table having a gain that is reduced as a frequency of the displayed image data is increased, and
wherein the console image data includes an increased sharpness of an edge component of the displayed image data.

7. The display device of claim 6, wherein the controller generates the console image data by correcting a zone plate pattern composed of circles corresponding to intermediate frequency component and circles corresponding to high frequency component, according to the console lookup table, and aliasing in a high frequency region that is an outline portion of the pattern occurs less than aliasing in an intermediate frequency region that is a central portion of the pattern in the zone plate pattern according to the generated console image data.

8. An operating method of a display device displaying image data received from an external device, the method comprising:
receiving reference information from the external device;
recognizing a type of the external device based on reference information of the external device;
correcting image quality of displayed image data based on viewing distance information corresponding to the type of the external device; and
outputting the corrected image data,
wherein based on the external device being a PC, the image quality of the displayed image data is corrected to generate PC image data by applying a weight to a high frequency component of the displayed image data,
wherein the PC image data is generated using a PC lookup table having a gain that is increased as a frequency of the displayed image data is increased, and
wherein the PC image data includes an increased sharpness of a detail component of the displayed image data,
wherein the PC image data is generated by correcting a zone plate pattern composed of circles corresponding to intermediate frequency component and circles corresponding to high frequency component, according to the PC lookup table, and aliasing in a high frequency region that is an outline portion of the pattern occurs more than aliasing in an intermediate frequency region that is a central portion of the pattern in the zone plate pattern according to the generated PC image data.

9. The method of claim 8, wherein based on the external device being a console device, the image quality of the displayed image data is corrected to generate console image data by applying a weight to an intermediate frequency component of the displayed image data.

10. The method of claim 9, wherein the console image data is generated using a console lookup table having a gain that is reduced as a frequency of the displayed image data is increased, and
wherein the console image data includes an increased sharpness of an edge component of the displayed image data.

* * * * *